United States Patent
Thompson et al.

(10) Patent No.: US 10,721,918 B2
(45) Date of Patent: Jul. 28, 2020

(54) POULTRY HOUSING UNIT PLENUM FLOORING VENTILATION SYSTEM AND METHOD

(71) Applicant: Poultry EcoServices, LLC, Annapolis, MD (US)

(72) Inventors: Patrick Clark Thompson, Arnold, MD (US); Rafael Sepulveda Correa, Salisbury, MD (US)

(73) Assignee: Poultry Ecoservices, LLC, Annapolis, MD (US)

( * ) Notice: Subject to any disclaimer, the term of this patent is extended or adjusted under 35 U.S.C. 154(b) by 129 days.

(21) Appl. No.: 16/196,394

(22) Filed: Nov. 20, 2018

(65) Prior Publication Data
US 2019/0297854 A1 Oct. 3, 2019

Related U.S. Application Data

(63) Continuation-in-part of application No. 15/944,524, filed on Apr. 3, 2018, now abandoned.

(51) Int. Cl.
*A01K 31/22* (2006.01)
*A01K 31/00* (2006.01)
*A01K 1/00* (2006.01)

(52) U.S. Cl.
CPC ........... *A01K 31/007* (2013.01); *A01K 1/0052* (2013.01); *A01K 31/22* (2013.01)

(58) Field of Classification Search
CPC .. A01K 1/0158; A01K 1/0052; A01K 1/0047; A01K 1/0076; A01K 1/0151; A01K 31/007
See application file for complete search history.

(56) References Cited

U.S. PATENT DOCUMENTS

| 4,184,538 A | * | 1/1980 | Rauenhorst | A01K 1/0047 165/66 |
| 6,293,120 B1 | * | 9/2001 | Hashimoto | F24D 11/006 62/260 |

(Continued)

FOREIGN PATENT DOCUMENTS

| DE | 4416686 A1 | * | 12/1995 | ............. B01D 53/85 |
| EP | 3219201 A1 | * | 9/2017 | ........... A01K 1/0058 |

*Primary Examiner* — Magdalena Topolski
*Assistant Examiner* — Morgan T Barlow
(74) *Attorney, Agent, or Firm* — Laubscher & Laubscher, P.C.

(57) ABSTRACT

A plenum flooring system installed over high density insulation panels, preventing heat loss to ground and intrusion of ground moisture. The system includes one or more flooring segments, each containing at least one surface opening to the plenum space, and a plenum ventilation system. The ventilation system includes a blower and air inlet openings in seals arranged along the perimeter of the plenum flooring segments at the walls of the interior of a poultry house. The blower withdraws air from the plenum space through the surface opening of the flooring segment and discharges it into the poultry house, creating a continuous flow of air to maintain uniform flooring surface temperatures and remove moisture that migrates to the plenum space from manure on the perforated flooring surface due to moisture gradient, then a refrigerated dehumidifier/air circulation unit to condense moisture in the air and discharges that liquid to the house exterior.

7 Claims, 3 Drawing Sheets

(56) References Cited

U.S. PATENT DOCUMENTS

| | | | |
|---|---|---|---|
| 6,321,687 B1* | 11/2001 | Lemmon | A01K 1/0047 |
| | | | 119/448 |
| 8,132,535 B2 | 3/2012 | Correa | |
| 10,251,367 B2* | 4/2019 | Chang | A01K 1/0047 |
| | | | 119/448 |
| 2004/0079040 A1* | 4/2004 | MacLean | E04F 19/10 |
| | | | 52/302.1 |
| 2004/0255870 A1* | 12/2004 | McGregor | A01K 1/0151 |
| | | | 119/528 |
| 2007/0006815 A1* | 1/2007 | Correa | A01K 31/007 |
| | | | 119/443 |
| 2011/0061601 A1* | 3/2011 | Correa | A01K 31/04 |
| | | | 119/437 |
| 2014/0096719 A1* | 4/2014 | Klocke | A01K 1/0052 |
| | | | 119/448 |
| 2016/0037743 A1* | 2/2016 | Lemmon | F24F 11/89 |
| | | | 119/448 |
| 2016/0316712 A1* | 11/2016 | Kratzer | A01K 1/0052 |
| | | | 119/448 |
| 2017/0290304 A1 | 10/2017 | Thompson et al. | |

\* cited by examiner

POULTRY HOUSING UNIT PLENUM FLOORING VENTILATION SYSTEM AND METHOD

This application is a continuation-in-part of U.S. patent application Ser. No. 15/944,524 filed Apr. 3, 2018.

BACKGROUND OF THE DISCLOSURE

The present disclosure relates generally to agricultural food animal production and more specifically to improving the performance of ventilated plenum flooring systems as an alternative to the use of bedding or litter material and/or high ventilation rates to manage manure and air quality within a commercial broiler (meat) poultry housing unit.

Commercial production of broiler poultry is generally performed in large housing units that are designed to protect poultry flocks from external threats, such as natural predators, to maintain optimal temperature/humidity conditions according to the age of the flocks, and to facilitate uniform delivery of nutrition to large flocks. In most cases, the flocks are primarily confined within the housing unit throughout their development from hatchlings to market weight mature birds. During this confinement, a bed of manure accumulates on the floor of the housing unit. Effective management of the manure bed is critical to ensuring the comfort and health of flocks.

Commercial producers have adopted specific methods for managing manure during the flock growth period. Typically, the housing unit floor is covered with a bedding or litter material to absorb and dilute manure moisture. In the United States, litter is typically reused in the same housing unit for multiple flocks in succession, resulting in a buildup of manure within the litter and a corresponding increase in ammonia production due to biochemical activity. Fresh air ventilation and other measures are used to maintain housing unit interior conditions for bird comfort and health, resulting in increased annual water and energy costs without resolving external environmental and public health concerns related to increased ammonia and other pollutant releases.

The use of a modular plenum flooring system such as the one disclosed in the Correa et al. U.S. Pat. No. 8,132,535, is an alternative to the use of litter. Such flooring systems have the potential to reduce ammonia production, reduce pathogen and insect infestation, and decrease water, fuel and electricity usage, thereby improving the health of a flock of poultry and reducing the cost of producing the flock. The shortcoming of plenum flooring systems is that they have failed to provide consistent conditions required for manure moisture control and bird comfort.

A study of the flooring system of U.S. Pat. No. 8,132,535 conducted at the University of Georgia under the sponsorship of a United States Department of Agriculture Conservation Innovation Grant concluded that the plastic flooring system, described as a Litter-less Flooring System (LFS), showed promise in reducing ammonia and airborne particulate matter, but fell short of matching or improving upon the performance of conventional litter management on factors such as bird welfare and mortality, energy usage, labor, and longevity of the system components. The study concluded that, on the basis of these results, significant further research and development would be required before the system could be considered a commercially viable product.

Following that study, tests were conducted over an 18-month period which reaffirmed the UGA study conclusions and provided insights to address each of the identified shortcomings. During the tests, thermal imaging was used to better understand variations in the flooring temperature and manure moisture, and housing unit heating was performed with both radiant and forced air heaters. The tests showed that neither heater type can maintain consistent flooring temperatures required for bird comfort during the brooding period. Radiant heaters caused localized over-heating, causing floor surface panels to buckle due to material expansion. Forced air heaters eliminated localized over-heating and eliminated lifting due to expansion but did not provide consistent floor temperatures required for bird health and comfort. Inconsistent flooring temperatures could not be alleviated by variations in the direction or rate of plenum ventilation flow.

Due to the limited mass and thermal storage capacity of plastic plenum flooring modules and rapid conductive heat losses to the ground, frequent operation of poultry housing unit heaters is required to maintain bird comfort and avoid huddling of chicks for warmth. This deficiency increases energy usage and may result in premature failure and physical damage to polymer flooring panels due to repeated overheating in attempts to improve manure drying and maintain conditions for bird comfort and welfare. Further, even with a thin moisture barrier as prescribed in the '535 patent, heat transfer between the flooring module lower panel and the ground causes buildup of condensation within the plenum space, reducing the efficiency of manure moisture removal and creating conditions for increased growth of fungi and bacteria.

The benefits of plenum flooring over litter treatments are diminished by the lack of consistent temperature and moisture control, resulting in a poultry flock that is more prone to foot pad dermatitis and may be less healthy compared to litter-based manure management methods.

SUMMARY OF THE DISCLOSURE

Accordingly, it is an object of the present disclosure to provide a plenum flooring ventilation system that ensures uniform flooring surface temperatures and effective manure moisture control within a poultry housing unit without increasing labor and energy costs or reducing the longevity of the system components.

A first embodiment of the present disclosure includes a plenum flooring ventilation system that has at least one plenum flooring segment installed in a poultry housing unit as described in U.S. patent application Ser. No. 15/484,230, the entire contents of which are incorporated herein by reference. The plenum flooring segment includes at least one ventilation opening and a flooring plenum space, and the ventilation system includes air intake openings in seals that are arranged along the perimeter of the plenum flooring segments at the walls of the poultry housing unit interior. The ventilation system further includes a blower that withdraws air from the plenum flooring space through the flooring ventilation opening and discharges it into the poultry housing unit chamber to create a continuous flow of air within the plenum space. A housing unit ventilation system removes moisture contained in the plenum ventilation air that is discharged to the housing unit chamber. Preferably, a plenum floor ventilation system controller is provided to modulate the speed of the blower to promote uniform surface temperatures and effective removal of moisture from the flooring plenum space.

Continuous plenum ventilation results in uniform flooring surface temperatures and provides manure drying by evacuating moisture from the plenum space. Continuous evacuation induces capillary migration of moisture through surface panel perforations by creating a moisture gradient between the air within the plenum flooring space and manure accumulated on the flooring surface.

The elimination of sorbent bedding material n combination with the transfer of moisture from the floor plenum to the housing unit chamber air space results in the need for supplemental chamber air dehumidification. Thus, a further embodiment includes the use of refrigerated dehumidifiers/air circulation units to provide cost effective dehumidification and to provide air mixing to minimize thermal stratification of chamber air within the brooding area during early stage flock growth. Preferably, at least one dehumidifier/air circulation unit is placed within the chamber space for each plenum flooring segment within the brooding area. When housing unit chamber air is drawn across the dehumidifier cooling coils, moisture is condensed, allowing removal from the housing unit as a liquid. This supplemental moisture removal by one or more dehumidifier units allows operation of the housing unit ventilation at a reduced rate to minimize energy consumption and aids in achieving and maintaining desired manure dryness during the critical period when a newly placed flock is highly susceptible to foot pad dermatitis.

In another embodiment, filter media is arranged at the perimeter seal air intake openings to prevent entrainment of feathers, dandruff and other particulate matter into the flooring plenum space. A high efficiency insulation layer is placed between the aggregate layer or concrete slab and the plenum flooring modules to minimize conductive thermal losses to the ground.

BRIEF DESCRIPTION OF THE DRAWINGS

Other objects and advantages of the disclosure will become apparent from a study of the following specification when viewed in the light of the accompanying drawing, in which.

DETAILED DESCRIPTION

Figure 1:
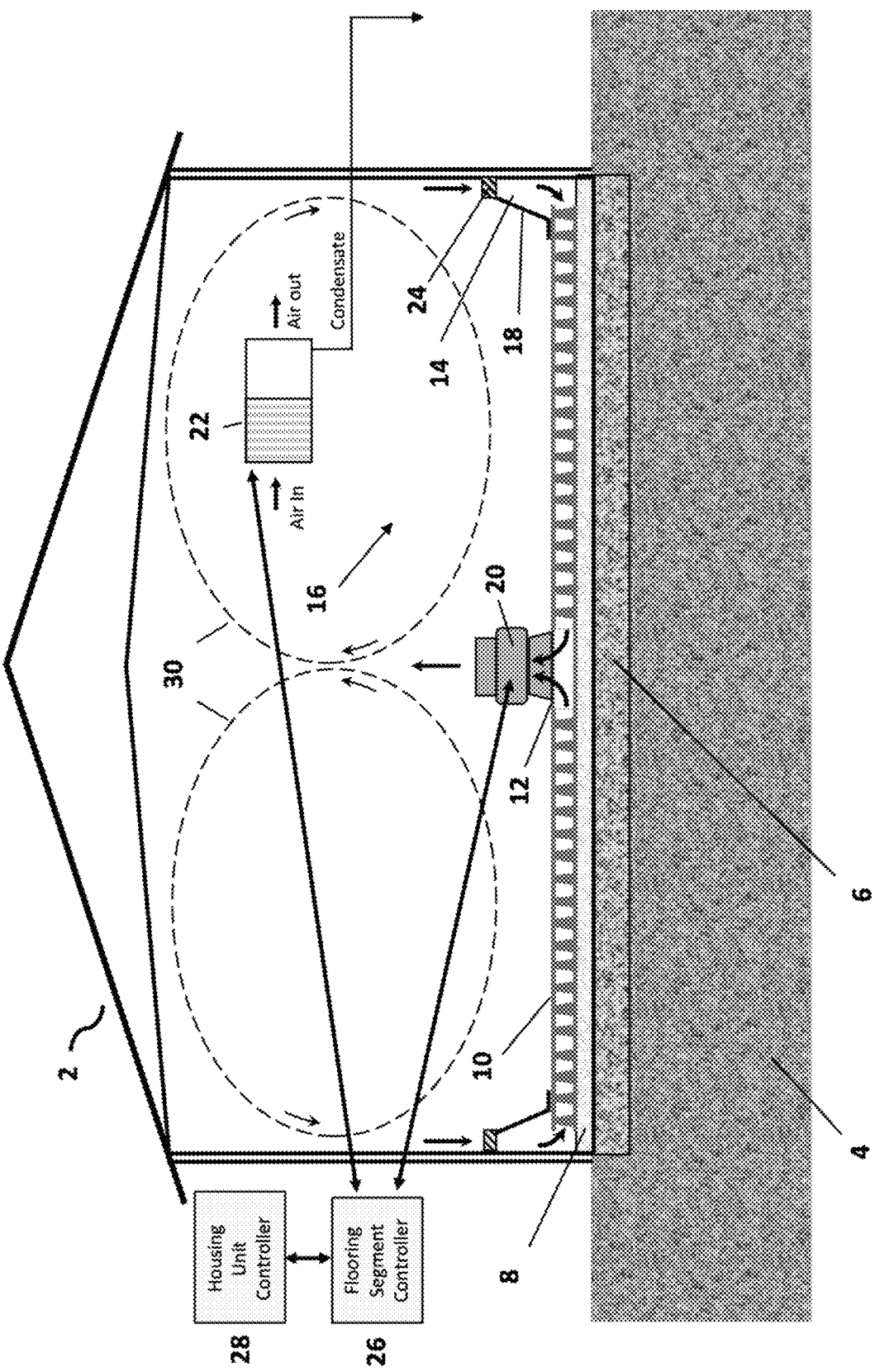
FIG. 1 is a graphical representation of a poultry housing unit with a ventilation system according to the present disclosure.
Figure 2:
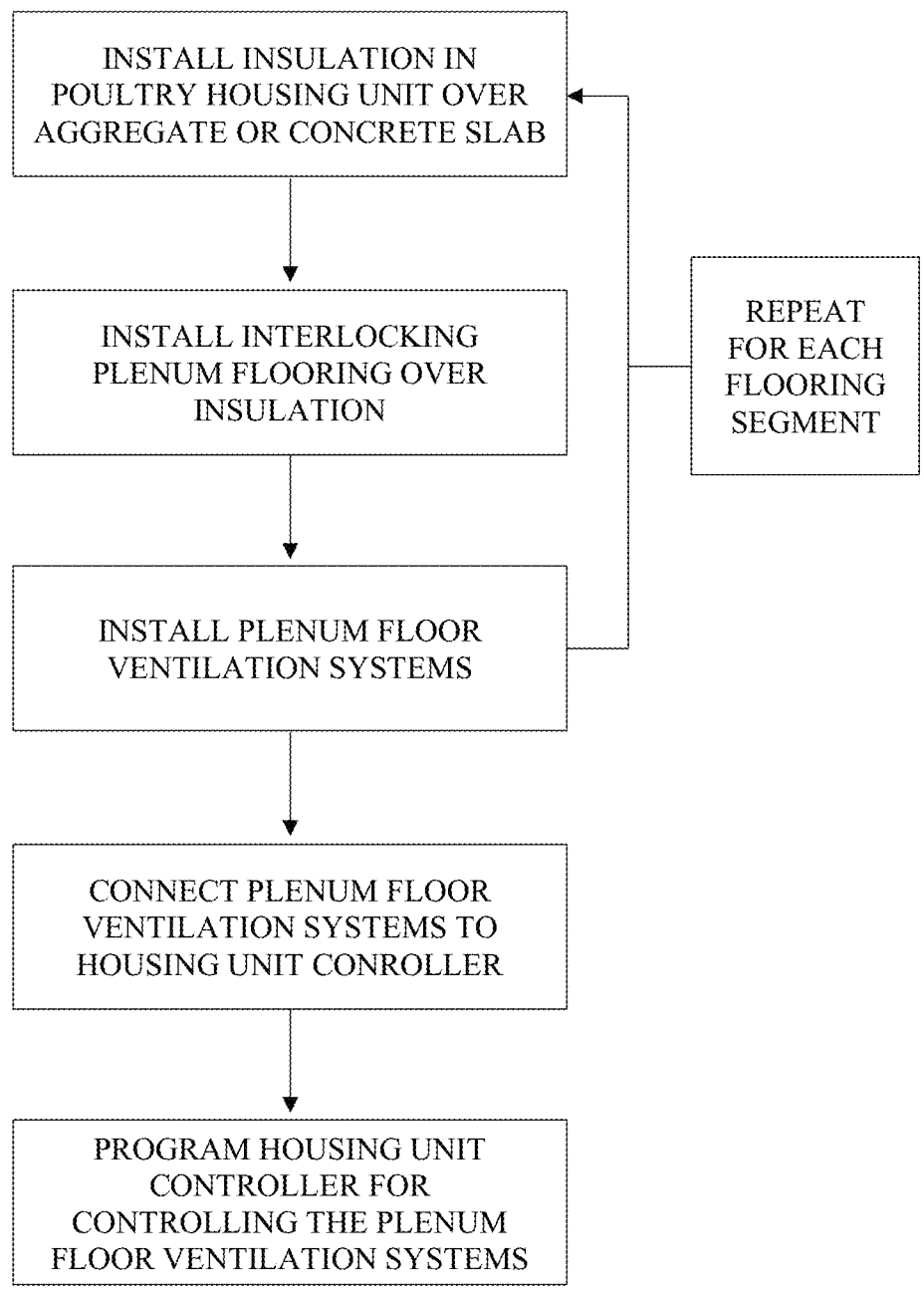
FIG. 2 is a flow chart of the steps for installing the poultry housing ventilation system of FIG. 1.

Referring to FIGS. 1 and 2, there is shown a preferred embodiment for the poultry housing unit plenum flooring ventilation system of the present disclosure and a process for installing the system, respectively. The ventilation system is installed in a new or existing poultry housing unit 2. For a new unit or an existing unit with an earthen floor, the poultry house base pad 4 is first cleared of debris, manure residue and underground obstacles. For both new and retrofit installations, removal of organic materials and obstacles near the surface is required to eliminate interference. This is not required for a housing unit that has a concrete floor. Once the debris is removed, compactable material 6 should be added to minimize deflection under concentrated loads from service vehicles and ensure the surface elevation is above that of the adjacent ground outside the housing unit.

For existing housing units with a concrete floor, the floor is inspected and cleared of any protrusions or surface degradations that would cause plastic floor panels to flex and break under compression load of service vehicles. The surface is then cleaned and disinfected.

Next, panels of high-density foam insulation 8 are placed on the concrete slab or compacted aggregate layer 6 to provide a barrier that prevents heat and moisture transfer between plenum flooring modules and the earthen base pad 4. Further, the moisture barrier prevents incursion of ground moisture that could reduce the manure drying effectiveness of the flooring ventilation system by reducing the moisture gradient between the manure on the floor surface and air within the plenum space.

Once the lower layers are installed, interlocking plenum flooring segments 10 are placed upon the insulation 8 over the entire housing unit floor area. Each segment includes upper and lower panels which define a plenum space therebetween. The upper panel is perforated with openings that are designed to prevent passage of solids while allowing flow of liquid or vapor. Manure from the poultry flock collects on the upper panel of each flooring segment. Moisture from the manure wicks through the manure and the upper panel perforations by capillary action and enters the plenum space. Each flooring segment contains a centrally located outlet opening 12 and a plurality of air inlet openings 14 at the perimeter of the segment. The openings allow continuous flow of air through the plenum space. The arrangement of the centrally located outlet opening 12 and the perimeter openings 14 is coordinated to provide uniform air flow throughout the flooring segment plenum space. However, it will be understood by those with skill in the art that the opening need not be centrally located, and/or each segment could have multiple openings provided in spaced relation.

The flooring is divided into segments spanning the width of the housing unit. For most housing units, between four and seven segments will be needed. By way of example only, a segment may be between 40 and 70 feet wide and 100 feet in length.

Following the plenum flooring installation, at least one plenum floor ventilation system 16 is installed and connected with each plenum flooring segment. Preferably, each plenum flooring segment has its own plenum ventilation system. It will be understood by those of ordinary skill in the art that the number of plenum floor ventilation systems can vary for each plenum flooring segment.

The ventilation system 16 includes a seal 18 arranged around the perimeter of each flooring segment. The seal contains the air intake openings 14 that allow flow of air from the housing unit chamber into the flooring segment plenum space. Air is drawn to floor opening 12 by a variable speed blower 20 connected with the opening. The blower provides continuous air flow through the flooring segment plenum to maintain uniform surface temperatures and evacuate moisture. This is accomplished by drawing air through the intake openings, into the flooring plenum space, and through the floor opening. As this is done, moisture entering the plenum flooring space from the manure on the upper panel of the plenum flooring is collected and carried away with the drawn air, which is then discharged to the housing unit chamber.

Within the housing unit brooding area, each flooring segment has a corresponding dehumidifier/air circulation unit 22 which draws housing unit chamber air across a chill coil to condense moisture and reduce the humidity of air within the housing unit chamber. This dehumidification assists with the removal of moisture from the recirculated air within the brooding area of the poultry housing unit chamber. The condensate from the dehumidifier is transported to the exterior of the housing unit. The removal of moisture from the recirculated air in the poultry housing unit is especially important for effective manure moisture control during early stage flock growth when housing unit ventilation rates are reduced and birds are most susceptible to foot pad dermatitis.

A filter element 24 is placed over the perimeter air inlet openings 14 to prevent entrainment and to avoid buildup of dust, dander, feathers and debris within the flooring plenum space. Individual segment blower controls are connected to the segment ventilation system controller 26. The flooring segment ventilation system controllers are programmed for automatic operation of the flooding plenum system in coordination with the main housing unit controller 28. Continuous intake of air from the housing unit chamber through the plenum flooring space and back to the chamber induces air circulation 30 that further minimizes thermal stratification during low rates of housing unit ventilation that occur during the early stages of flock growth. Reduced thermal stratification promotes bird comfort and increased energy efficiency.

Figure 3:
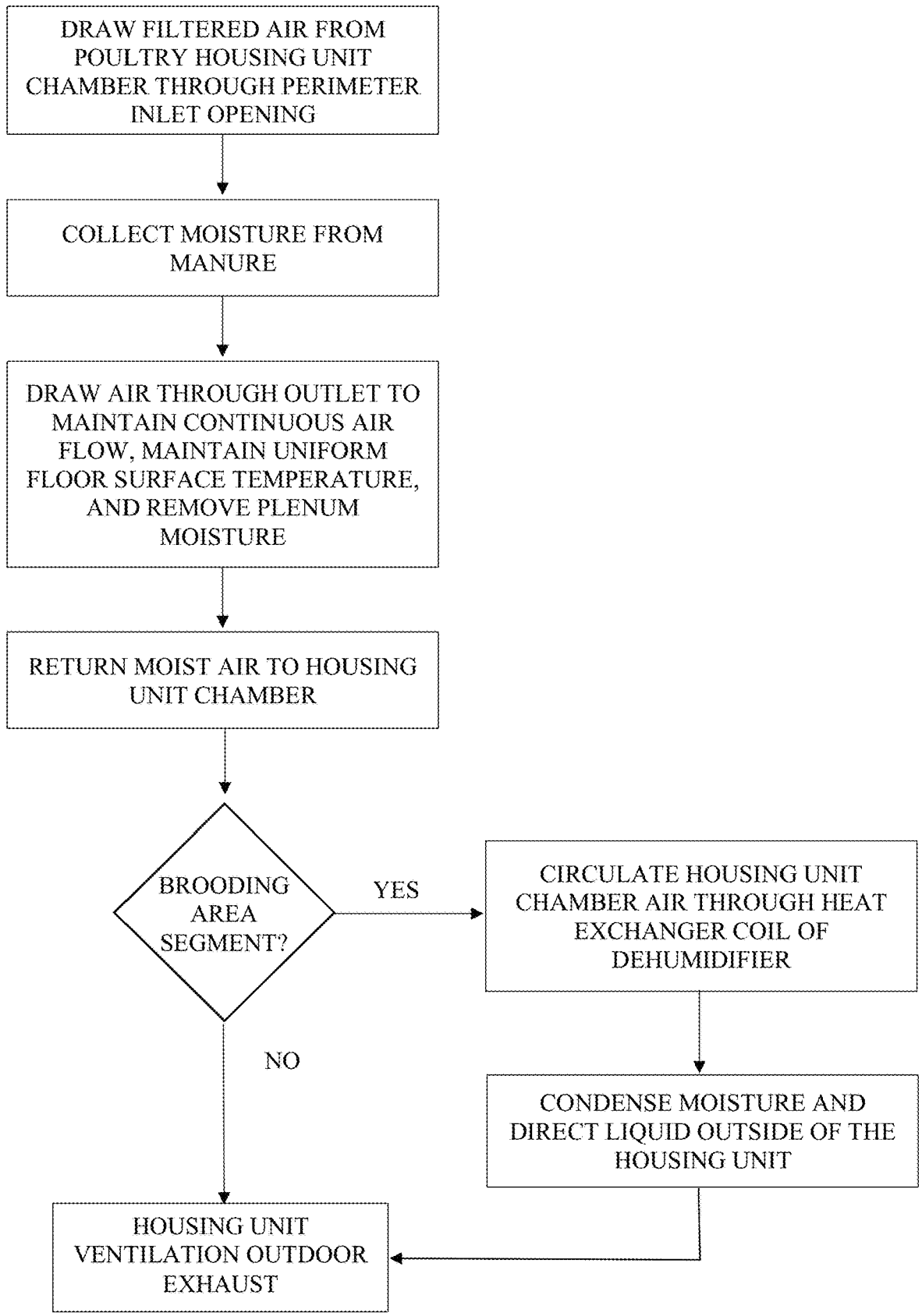
FIG. 3 is a flow chart of the method steps for ventilating the flooring segment plenum space and providing supplemental moisture removal from a poultry housing unit chamber.

FIG. 3 is a flow chart showing the steps of a preferred method of the present disclosure which demonstrates how the embodiment described above and shown in FIGS. 1 and 2 will maintain uniform flooring segment surface temperature, remove moisture from the flooring segment plenum space and provide supplemental moisture removal from the brooding area chamber of the housing unit. Specifically, air is drawn from the housing unit chamber through the filtered perimeter seal inlet openings, into and through the flooring segment plenum space, and through the plenum flooring opening via the blower. As the air is pulled through the ventilation system, it collects moisture that migrates from manure on the surface of the plenum floor into the flooring segment plenum space. The air is discharged into the housing chamber to maintain a continuous air flow and a uniform floor surface temperature, and to remove moisture from the plenum space. Chamber air is drawn across the chilled coils of a flooring segment dehumidifier to condense moisture which is then directed to the exterior of the housing unit. Reduced chamber air humidity improves flooring segment manure moisture control during the critical brooding stage of the flock development.

A flooring segment ventilation system controller automatically adjusts the blower speed according to the main housing ventilation rate and humidity conditions within the housing unit chamber. Controllers associated with flooring segments within the brooding area also automatically adjust humidistat settings for efficient dehumidifier/air circulation unit performance. Individual flooring segment ventilation system controllers are integrated with the housing unit controller.

Plenum flooring system performance is improved by the use of thermal insulation and the addition of dehumidifiers. The insulation prevents heat loss to the ground and the dehumidifiers offset the combined effects of absorbent bedding elimination and transfer of manure moisture to the housing unit air. These features eliminate uneven flooring surface temperatures and manure moisture control shortcomings of prior plenum flooring ventilation systems. The dehumidifier/air circulation units enable transfer of manure moisture to the housing unit internal air space rather than outdoors. This, in turn, allows air circulation between the flooring plenum space and the housing unit chamber so that the flooring ventilation system can be used with either positive or negative pressure housing unit ventilation systems. Unlike with many other systems, supplemental heating and an induced pressure differential between the chamber and plenum floor space are not needed in the current system. Removing these elements simplifies the process and reduces the overall cost of operating the plenum flooring ventilation system.

Although the above description refers to various embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure or to the illustrative embodiments and that other arrangements may be devised and employed without departing from the spirit and scope of the present disclosure.

What is claimed is:

1. A plenum flooring ventilation system for a poultry housing unit, comprising:
   (a) a layer of insulation covering one of a concrete slab and compacted aggregate layer of the poultry housing unit;
   (b) at least one plenum flooring segment mounted on said layer of insulation, said flooring segment including interlocking modules with perforated upper surface panels which define a plenum space, a plurality of air inlet openings and at least one outlet opening spaced from said inlet opening, said inlet and outlet openings communicating with said plenum space;
   (c) a blower directly connected with said flooring segment outlet opening configured to recirculate air from the poultry housing unit, drawing the air through said inlet openings, to said plenum space and out through said outlet opening;
   (d) at least one dehumidifier/air circulation unit, arranged in the brooding area of poultry housing unit which condenses a portion of the moisture collected by the recirculated air from manure within the poultry housing unit and which directs the condensate to the exterior of the poultry housing unit, such that the ventilation system reduces the relative humidity of the air within the poultry housing unit brooding area chamber and maintains a uniform temperature of said plenum flooring segment regardless of an air pressure differential between the poultry housing unit interior and exterior.

2. The plenum flooring ventilation system as defined in claim 1, and further comprising filter elements with said plurality of plenum flooring inlet openings.

3. The plenum flooring ventilation system as defined in claim 1, and further comprising a seal arranged around a perimeter of said plenum flooring segment, said seal containing said plurality of inlet openings.

4. The plenum flooring ventilation system as defined in claim 1, and further comprising a controller for controlling the speed of said blower and said dehumidifier/air circulation unit to maintain a uniform surface temperature and remove moisture from said flooring plenum space.

5. A method for ventilating a poultry housing unit, comprising the steps of
   (a) providing an insulation layer covering one of a concrete slab and compacted aggregate layer of the poultry housing unit;
   (b) providing at least one plenum flooring segment on the insulation layer to retain manure from a poultry flock, the plenum flooring segment having a perforated upper panel through which moisture from the manure is wicked onto a plenum space within the plenum flooring segment;

(c) continuously circulating air from a chamber in the poultry housing unit by a blower directly connected with an outlet opening of the flooring segment, drawing the air through at least one opening of the flooring segment, through the at least one plenum flooring segment plenum space to collect moisture from the plenum space and out through the outlet, thus transferring the moisture to the poultry housing unit chamber; and (d) condensing moisture from the circulated air within a brooding area of the poultry housing unit chamber and directing condensate to the exterior of the poultry housing unit, thereby reducing humidity within the brooding area of the poultry housing unit chamber while maintaining a uniform temperature on the plenum flooring segment upper panel and promoting air circulation to minimize thermal stratification within the brooding area of the poultry housing unit chamber.

6. The method as defined in claim 5, and further comprising the step of filtering the recirculated air as it enters perimeter seal inlet openings.

7. The method as defined in claim 6, and further comprising the step of controlling the speed of the recirculated air regardless of an air pressure differential between the interior and exterior of the poultry housing unit.

\* \* \* \* \*